United States Patent
Devos (10) Patent No.: US 12,173,515 B2
(45) Date of Patent: *Dec. 24, 2024

(54) FLOOR PANEL FOR FORMING A FLOOR COVERING

(71) Applicant: FLOORING INDUSTRIES LIMITED, SARL, Bertrange (LU)

(72) Inventor: Pieter Devos, Koolskamp (BE)

(73) Assignee: UNILIN BV, Wielsbeke (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,867

(22) Filed: Mar. 22, 2023

(65) Prior Publication Data
US 2023/0228101 A1 Jul. 20, 2023

Related U.S. Application Data

(63) Continuation of application No. 17/243,297, filed on Apr. 28, 2021, now Pat. No. 11,634,912, which is a
(Continued)

(51) Int. Cl.
*E04F 15/10* (2006.01)
*B32B 3/06* (2006.01)
(Continued)

(52) U.S. Cl.
CPC .............. *E04F 15/105* (2013.01); *B32B 3/06* (2013.01); *B32B 5/18* (2013.01); *B32B 7/02* (2013.01);
(Continued)

(58) Field of Classification Search
CPC ..... E04F 15/02038; E04F 15/02; E04F 15/10; E04F 15/105; E04F 2201/03;
(Continued)

(56) References Cited

U.S. PATENT DOCUMENTS 6,536,178 B1 3/2003 Palsson et al.
7,121,058 B2* 10/2006 Palsson ............ E04F 15/02038
52/273
(Continued)

FOREIGN PATENT DOCUMENTS

CN 2866694 Y 2/2007
CN 102695838 A 9/2012
(Continued)

OTHER PUBLICATIONS

Office Action from corresponding Chinese Application No. 2020103494494, Mar. 29, 2021.
(Continued)

*Primary Examiner* — Jessie T Fonseca
(74) *Attorney, Agent, or Firm* — Workman Nydegger (57) ABSTRACT

A floor panel for forming a floor covering comprises a substrate consisting of at least two substrate layers differing in density and, on at least one pair of opposite edges, is provided with coupling parts of the so-called push-lock type. Vertically active locking surfaces, where they cooperate in the coupled condition of two of such floor panels, define a tangent line which is horizontal or does not deviate more than 50 degrees from the horizontal. The locking surfaces are situated closer to the upper side of the first substrate layer than to the lower side of the first substrate layer.

16 Claims, 3 Drawing Sheets

Related U.S. Application Data continuation of application No. 16/901,785, filed on Jun. 15, 2020, now Pat. No. 11,021,881, which is a continuation of application No. 16/564,628, filed on Sep. 9, 2019, now Pat. No. 10,745,922, which is a continuation of application No. 16/051,644, filed on Aug. 1, 2018, now Pat. No. 10,407,921, which is a continuation of application No. 15/543,746, filed as application No. PCT/IB2016/050135 on Jan. 13, 2016, now Pat. No. 10,072,428.

(60) Provisional application No. 62/103,749, filed on Jan. 15, 2015.

(51) Int. Cl.

| | |
|---|---|
| *B32B 5/18* | (2006.01) |
| *B32B 7/02* | (2019.01) |
| *B32B 9/02* | (2006.01) |
| *B32B 9/04* | (2006.01) |
| *B32B 25/04* | (2006.01) |
| *B32B 27/06* | (2006.01) |
| *B32B 27/08* | (2006.01) |
| *B32B 27/20* | (2006.01) |
| *B32B 27/22* | (2006.01) |
| *B32B 27/30* | (2006.01) |
| *B32B 27/32* | (2006.01) |
| *B32B 27/36* | (2006.01) |
| *B32B 27/40* | (2006.01) |
| *E04F 15/02* | (2006.01) |

(52) U.S. Cl.
CPC .............. *B32B 9/02* (2013.01); *B32B 9/046* (2013.01); *B32B 25/045* (2013.01); *B32B 27/065* (2013.01); *B32B 27/08* (2013.01); *B32B 27/20* (2013.01); *B32B 27/22* (2013.01); *B32B 27/304* (2013.01); *B32B 27/32* (2013.01); *B32B 27/36* (2013.01); *B32B 27/40* (2013.01); *E04F 15/02038* (2013.01); *E04F 15/107* (2013.01); *B32B 2255/10* (2013.01); *B32B 2266/0235* (2013.01); *B32B 2266/025* (2013.01); *B32B 2266/0264* (2013.01); *B32B 2266/0278* (2013.01); *B32B 2307/412* (2013.01); *B32B 2307/414* (2013.01); *B32B 2307/732* (2013.01); *B32B 2471/00* (2013.01); *B32B 2607/00* (2013.01); *E04F 2201/0123* (2013.01); *E04F 2201/0138* (2013.01); *E04F 2201/0146* (2013.01); *E04F 2201/0153* (2013.01); *E04F 2201/023* (2013.01); *E04F 2201/03* (2013.01); *E04F 2201/04* (2013.01); *E04F 2201/043* (2013.01); *E04F 2201/045* (2013.01); *E04F 2201/048* (2013.01); *E04F 2201/049* (2013.01)

(58) Field of Classification Search
CPC ............ E04F 2201/04; E04F 2201/045; E04F 2201/048; E04F 2201/049; E04F 2201/021; E04F 2201/023; E04F 2201/0123; E04F 2201/013; E04F 2201/0138; E04F 2201/0146; E04F 15/107; B32B 2471/00
See application file for complete search history.

(56) References Cited

U.S. PATENT DOCUMENTS

| | | |
|---|---|---|
| 8,544,230 B2 | 10/2013 | Pervan |
| 8,898,988 B2 | 12/2014 | Pervan |
| 9,453,347 B2 | 9/2016 | Pervan |
| 9,528,278 B2 | 12/2016 | Cappelle |
| 9,650,792 B2 | 5/2017 | Ramachandra |
| 9,670,682 B2 | 6/2017 | Cappelle |
| 9,670,683 B2 | 6/2017 | Cappelle |
| 10,428,534 B2 | 10/2019 | Cappelle |
| 10,550,582 B2 | 2/2020 | Cappelle |
| 2003/0145549 A1 | 8/2003 | Palsson et al. |
| 2004/0128934 A1 | 7/2004 | Hecht |
| 2004/0211143 A1 | 10/2004 | Hanning |
| 2004/0250492 A1 | 12/2004 | Becker |
| 2007/0130872 A1 | 6/2007 | Goodwin et al. |
| 2008/0241440 A1 | 10/2008 | Bauer |
| 2008/0245020 A1 | 10/2008 | Kiefel et al. |
| 2009/0133353 A1 | 5/2009 | Pervan et al. |
| 2010/0031594 A1 | 2/2010 | Liu et al. |
| 2010/0037550 A1 | 2/2010 | Braun |
| 2010/0293879 A1 | 11/2010 | Pervan et al. |
| 2010/0300029 A1 | 12/2010 | Braun et al. |
| 2011/0131909 A1 | 6/2011 | Hannig |
| 2011/0138722 A1 | 6/2011 | Hannig |
| 2011/0167750 A1 | 7/2011 | Pervan |
| 2011/0271632 A1* | 11/2011 | Cappelle ................. E04F 15/02 52/582.2 |
| 2012/0096801 A1 | 4/2012 | Cappelle |
| 2012/0180416 A1* | 7/2012 | Perra ................. E04F 15/02038 52/309.1 |
| 2012/0266555 A1 | 10/2012 | Cappelle |
| 2013/0036695 A1 | 2/2013 | Durnberger |
| 2013/0042558 A1 | 2/2013 | Cordeiro |
| 2013/0097959 A1 | 4/2013 | Michel |
| 2013/0104485 A1* | 5/2013 | Meersseman ............ B27N 7/00 428/53 |
| 2013/0104486 A1 | 5/2013 | Windmoller |
| 2013/0212971 A1 | 8/2013 | Cordeiro |
| 2013/0276398 A1 | 10/2013 | Hannig |
| 2013/0309441 A1 | 11/2013 | Hannig |
| 2014/0007539 A1 | 1/2014 | Pervan et al. |
| 2014/0020324 A1 | 1/2014 | Pervan |
| 2014/0033633 A1 | 2/2014 | Kell |
| 2014/0215946 A1 | 8/2014 | Roy et al. |
| 2014/0352248 A1 | 12/2014 | Whispell et al. |
| 2015/0000221 A1* | 1/2015 | Boo ......................... E04C 2/40 52/588.1 |
| 2015/0059281 A1 | 3/2015 | Pervan |
| 2015/0240500 A1 | 8/2015 | Stevens, Jr. |
| 2016/0138274 A1* | 5/2016 | Anspach ............... E04F 15/105 52/177 |
| 2016/0333595 A1* | 11/2016 | Cappelle ............... E04F 15/105 |
| 2016/0356047 A1 | 12/2016 | Cappelle |
| 2016/0369516 A1 | 12/2016 | Cappelle |
| 2017/0067261 A1* | 3/2017 | Hannig ............. E04F 15/02038 |
| 2017/0089078 A1* | 3/2017 | Schacht ................. E04F 15/043 |
| 2017/0101785 A1 | 4/2017 | Cappelle |
| 2017/0101786 A1 | 4/2017 | Cappelle |
| 2017/0175400 A1* | 6/2017 | Josefsson .............. E04F 15/102 |
| 2017/0175401 A1* | 6/2017 | Kell ......................... E04C 2/38 |
| 2020/0087924 A1 | 3/2020 | Cappelle |

FOREIGN PATENT DOCUMENTS

| | | |
|---|---|---|
| CN | 102753772 A | 10/2012 |
| CN | 102985627 A | 3/2013 |
| DE | 2450360 A1 | 5/1976 |
| WO | 2011077311 A2 | 6/2011 |
| WO | 2011141851 A2 | 11/2011 |
| WO | 2013026559 A2 | 2/2013 |

OTHER PUBLICATIONS

Search Report from corresponding Chinese Application No. 2020103494494, Mar. 18, 2021.
Office Action from corresponding Chinese Application No. 2020103578076, Mar. 29, 2021.
Search Report from corresponding Chinese Application No. 2020103578076, Mar. 19, 2021.

(56) References Cited

OTHER PUBLICATIONS

International Search Report from PCT Application No. PCT/IB2016/050135, Apr. 20, 2016.

* cited by examiner

FLOOR PANEL FOR FORMING A FLOOR COVERING

BACKGROUND OF THE INVENTION

1. Field of the Invention

This invention relates to a floor panel for forming a floor covering, more particularly for forming a floor covering which can be installed on an underlying surface.

More particularly, the invention relates to a floor panel for forming a floor covering of the type wherein the floor panel comprises a substrate; wherein the floor panel comprises coupling parts on at least two opposite edges, which coupling parts allow that two of such floor panels can be coupled to each other by means of a downward movement of one floor panel in respect to the other floor panel; wherein the coupling parts, in the coupled condition of two of such floor panels, form a first locking system which effects a locking in a first direction in the plane of the floor panels and perpendicular to said edges, as well as form a second locking system which effects a locking in a second direction transverse to the plane of the floor panels; wherein the first locking system is formed at least of an upward-directed lower hook-shaped part which is situated on one of said two opposite edges, as well as a downward-directed upper hook-shaped part which is situated on the other, opposite edge of said two opposite edges, which hook-shaped parts can be engaged behind each other by means of said downward movement; wherein the lower hook-shaped part consists of a lip with an upward-directed locking element, whereas the upper hook-shaped part consists of a lip with a downward-directed locking element; wherein the second locking system comprises locking parts, which respectively are situated in the proximity of the proximal extremity of the lower hook-shaped part and the distal extremity of the upper hook-shaped part.

2. Related Art

Such type of floor panel is known, amongst others, from the document WO 2011/077311.

A general problem with such floor panels is obtaining a good balance between, on the one hand, the strength or solidity of the locking between the coupled floor panels and, on the other hand, the ease of installation of the floor panels.

SUMMARY OF THE DISCLOSURE

The present invention primarily aims at an alternative floor panel for forming a floor covering, of the aforementioned type. More particularly, the aim of this invention consists in that such floor covering can be installed easily, however, while still sufficient strength is maintained in the floor covering.

The inventor has found that this aim can be achieved by applying certain structural features and/or material characteristics of the substrate in combination with certain characteristics in the realization of the coupling parts.

These specific combinations of structural features and/or material characteristics of the substrate and characteristics in the realization of the coupling parts will be described herein below in six independent aspects of the present invention.

According to a first independent aspect thereof, the invention relates to a floor panel for forming a floor covering, of the aforementioned type, with the characteristic that said substrate relates to a composed substrate which consists at least of two substrate layers, to with a first synthetic material-based substrate layer and a second substrate layer situated preferably directly there above, which second substrate layer has a thickness of at least 0.5 mm and preferably at least 1 mm; that the density of the first substrate layer differs from the density of the second substrate layer, and preferably the second substrate layer has a higher density than the first substrate layer; that said locking parts are provided with locking surfaces, which, there, where they cooperate in the coupled condition of two of such floor panels, define a tangent line which is horizontal or does not deviate more than 50 degrees from the horizontal; and that said locking surfaces are situated closer to the upper side of the first substrate layer than to the lower side of the first substrate layer, irrespective whether these locking surfaces are situated in or not in said second substrate layer.

As the locking surfaces, there, where they cooperate in the coupled condition of two of such floor panels, define a tangent line which is horizontal or does not deviate more than 50 degrees from the horizontal, the advantage is obtained that a strong vertical locking can be provided between the coupled floor panels. However, the ease of installation of the floor panels still can be guaranteed by the specific location of the locking surfaces in respect to the substrate layers having a different density. That the density of these substrate layers is different moreover offers the possibility of optimizing them in function of the features they have to supply, for example, in respect to strength and/or elasticity.

According to an independent second aspect thereof, the present invention relates to a floor panel for forming a floor covering, of the aforementioned type, with the characteristic that said substrate relates to a composed substrate which consists at least of two substrate layers, to with a first synthetic material-based substrate layer and a second substrate layer situated preferably directly there above, which second substrate layer has a thickness of at least 0.5 mm and preferably at least 1 mm; that the first substrate layer is foamed, preferably is of the closed cell-type and still more preferably is of the so-called hard foam type, and preferably the second substrate layer is not foamed or is less foamed than the first substrate layer; that said locking parts are provided with locking surfaces, which, there, where they cooperate in the coupled condition of two of such floor panels, define a tangent line which is horizontal or does not deviate more than 50 degrees from the horizontal; and that said locking surfaces are situated closer to the upper side of the first substrate layer than to the lower side of the first substrate layer, irrespective whether these locking surfaces are situated in or not in said second substrate layer.

As the locking surfaces, there, where they cooperate in the coupled condition of two of such floor panels, define a tangent line which is horizontal or does not deviate more than 50 degrees from the horizontal, the advantage is obtained that a strong vertical locking can be provided between the coupled floor panels. However, the ease of installation of the floor panels still can be guaranteed by the specific location of the locking surfaces in respect to the respective substrate layers. That the synthetic material-based substrate layer is foamed, moreover offers the possibility of providing this substrate layer with useful features, such as in respect to hardness and/or deformability.

In a particular embodiment, the first substrate layer is foamed gradually, wherein the degree of foaming may increase in downward or in upward direction.

According to an independent third aspect thereof, the present invention relates to a floor panel for forming a floor covering, of the aforementioned type, with the characteristic that said substrate relates to a composed substrate which consists at least of two substrate layers, to with a first synthetic material-based substrate layer and a second substrate layer situated preferably directly there above, which second substrate layer has a thickness of at least 0.5 mm and preferably at least 1 mm; that the first substrate layer is extruded; that said locking parts are provided with locking surfaces, which, there, where they cooperate in the coupled condition of two of such floor panels, define a tangent line which is horizontal or does not deviate more than 50 degrees from the horizontal; and that said locking surfaces are situated closer to the upper side of the first substrate layer than to the lower side of the first substrate layer, irrespective whether these locking surfaces are situated in or not in said second substrate layer.

As the locking surfaces, there, where they cooperate in the coupled condition of two of such floor panels, define a tangent line which is horizontal or does not deviate more than 50 degrees from the horizontal, the advantage is obtained that a strong vertical locking can be provided between the coupled floor panels. However, the ease of installation of the floor panels still can be guaranteed by the specific location of the locking surfaces in respect to the respective substrate layers. That the synthetic material-based substrate layer is extruded, moreover offers the possibility of providing, in a simple and efficient manner, this substrate layer with functional features, such as in respect to rigidity and/or dimensional stability.

According to an independent fourth aspect thereof, the present invention relates to a floor panel for forming a floor covering, of the aforementioned type, with the characteristic that said substrate relates to a composed substrate which consists at least of two substrate layers, to with a first synthetic material-based substrate layer and a second substrate layer situated preferably directly there above, which second substrate layer has a thickness of at least 0.5 mm and preferably at least 1 mm; that both substrate layers are glued to each other, preferably by means of a waterproof glue; that said locking parts are provided with locking surfaces, which, there, where they cooperate in the coupled condition of two of such floor panels, define a tangent line which is horizontal or does not deviate more than 50 degrees from the horizontal; and that said locking surfaces are situated closer to the upper side of the first substrate layer than to the lower side of the first substrate layer, irrespective whether these locking surfaces are situated in or not in said second substrate layer.

As the locking surfaces, there, where they cooperate in the coupled condition of two of such floor panels, define a tangent line which is horizontal or does not deviate more than 50 degrees from the horizontal, the advantage is obtained that a strong vertical locking can be provided between the coupled floor panels. However, the ease of installation of the floor panels still can be guaranteed by the specific location of the locking surfaces in respect to the respective substrate layers. That the substrate is composed and is constructed of glued substrate layers, moreover offers the possibility of configuring each of these substrate layers in function of the features which they have to provide, such as in respect to elasticity and/or strength.

According to an independent fifth aspect thereof, the present invention relates to a floor panel for forming a floor covering, of the aforementioned type, with the characteristic that said substrate relates to a composed substrate which consists at least of two substrate layers, to with a first synthetic material-based substrate layer and a second substrate layer situated preferably directly there above, which second substrate layer has a thickness of at least 0.5 mm and preferably at least 1 mm; that said substrate layers are made according to any of the following possibilities or according to a combination thereof:

the density of the first substrate layer is different from the density of the second substrate layer, and preferably the second substrate layer has a higher density than the first substrate layer;

the first substrate layer is foamed and preferably is of the closed cell-type and still more preferably of the so-called hard foam-type, and preferably the second substrate layer is not foamed or is less foamed than the first substrate layer;

the first substrate layer is extruded; and/or both substrate layers are glued to each other, preferably by means of a waterproof glue;

that said locking parts are provided with locking surfaces, which, there, where they cooperate in the coupled condition of two of such floor panels, define a tangent line which is horizontal or does not deviate more than 50 degrees from the horizontal; that said locking surfaces are at least partially situated in the first substrate layer, and preferably are situated therein entirely; that said upward-directed locking element and said downward-directed locking element each are provided with a locking surface, which locking surfaces, in the coupled condition of two of such floor panels, cooperate; and that the locking distance is smaller than 1 cm, preferably smaller than 5 mm, and still more preferably smaller than 3 mm, which locking distance is formed by the horizontal distance between a vertical closing plane formed between two of such floor panels in the coupled condition, and a vertical plane through the middle of the zone over which said locking surfaces of the locking elements contact each other in the coupled condition.

As the locking surfaces, there, where they cooperate in the coupled condition of two of such floor panels, define a tangent line which is horizontal or does not deviate more than 50 degrees from the horizontal, the advantage is obtained that a strong vertical locking can be provided between the coupled floor panels. Moreover, the locking distance is relatively small, which allows performing the hook-shaped parts relatively compact, which is beneficial for the strength of the coupling. However, the ease of installation of the floor panels still can be guaranteed by the at least partial location of the locking surfaces in the first substrate layer. That the substrate is composed and is realized according to any of the possibilities mentioned in the respective aspect, moreover offers the possibility of configuring each of the mentioned substrate layers in function of the features they have to provide, such as in respect to elasticity and/or strength.

According to an independent sixth aspect thereof, the present invention relates to a floor panel for forming a floor covering, of the aforementioned type, with the characteristic that said substrate relates to a composed substrate which consists at least of two substrate layers, to with a first synthetic material-based substrate layer and a second substrate layer situated preferably directly there above, which second substrate layer has a thickness of at least 0.5 mm and preferably at least 1 mm; that said substrate layers are made according to any of the following possibilities or according to a combination thereof:

the density of the first substrate layer is different from the density of the second substrate layer, and preferably the second substrate layer has a higher density than the first substrate layer;

the first substrate layer is foamed and preferably is of the closed cell-type and still more preferably of the so-called hard foam-type, and preferably the second substrate layer is not foamed or is less foamed than the first substrate layer;

the first substrate layer is extruded; and/or both substrate layers are glued to each other, preferably by means of a waterproof glue;

that said locking parts are provided with locking surfaces, which, there, where they cooperate in the coupled condition of two of such floor panels, define a tangent line which is horizontal or does not deviate more than 50 degrees from the horizontal; and that said locking surfaces are at least partially situated in the second substrate layer, and preferably are situated therein entirely.

As the locking surfaces, there, where they cooperate in the coupled condition of two of such floor panels, define a tangent line which is horizontal or does not deviate more than 50 degrees from the horizontal, the advantage is obtained that a strong vertical locking can be provided between the coupled floor panels. However, the ease of installation of the floor panels still can be guaranteed by the at least partial location of the locking surfaces in the second substrate layer. That the substrate is composed and is realized according to any of the possibilities mentioned in the respective aspect, moreover offers the possibility of configuring each of the mentioned substrate layers in function of the features they have to provide, such as in respect to elasticity and/or strength.

It is also noted that any of the characteristics of any of the six independent aspects of the present invention can be combined at choice with any characteristic of another of the six independent aspects, as far as such combination is not contradictory.

Preferred and alternative embodiments of the present invention according to the six independent aspects are described herein below.

The first substrate layer of the composed substrate is synthetic material-based. Preferably, it comprises at least a thermoplastic material, wherein by "thermoplastic material" a material has to be understood which comprises at least a thermoplastic synthetic material. In other words, the first substrate layer preferably comprises at least a thermoplastic material, or this substrate layer is at least realized on the basis thereof.

Examples of synthetic materials which can be applied when realizing the first substrate layer relate to polyvinyl chloride, polyethylene, polypropylene, polyethylene terephthalate, polyurethane or a combination of two or more of the herein above-mentioned synthetic materials.

Preferably, the first substrate layer is a filled synthetic material composite. By this is meant that the first substrate layer, apart from a synthetic material, also comprises a filling. This filling may consist of one or a combination of the following materials: bamboo, cork, and/or wood. In particular, the filling consists of one or a combination of the herein above-mentioned materials in the form of fibers and/or dust and/or powder.

In case that the first substrate layer is made as a filled synthetic material composite, this substrate layer can also be foamed. Then it preferably is of the closed cell-type.

More generally, the first substrate layer can be foamed, independently of the embodiment of this substrate layer as a filled synthetic material composite. Preferably, this foaming leads to a density reduction of at least 10% or still better to a density reduction of at least 20%. More favorably, a density reduction between 20% and 60% is achieved.

The first substrate layer of the composed substrate can comprise at least one or more plasticizers. However, this first substrate layer preferably is of the rigid type. In other words, it is preferred that the first substrate layer does not contain any plasticizers. In case that plasticizers are applied indeed, those preferably are present in an amount of less than 20 phr and still more preferably in an amount between 5 and 15 phr.

Preferably, the first substrate layer comprises fillers, such as chalk, limestone and/or talc, which may or may not be applied in combination with the aforementioned filling.

In order to increase the stability of the first substrate layer, this substrate layer can be provided with at least one reinforcement layer, which preferably is made of glass fiber or the like. In particular, the reinforcement layer relates to a glass fiber cloth.

In practice, the first substrate layer preferably has a thickness of at least 3 mm, more preferably a thickness of at least 4 mm and still more preferably a thickness of at least 5 mm.

Preferably, the first substrate layer constitutes more than half of the thickness of the floor panel. In particular, this substrate layer determines the rigidity or solidity of the substrate of the floor panel.

The first and/or second substrate layer of the composed substrate preferably is realized water-resistant.

The second substrate layer of the composed substrate, just like the first substrate layer, preferably is synthetic material-based. It then preferably comprises a thermoplastic material, which preferably is of the soft or supple type.

Preferably, the second substrate layer can be realized on the basis of vinyl, such as polyvinyl chloride, more particularly soft polyvinyl chloride, polyethylene, more particularly soft polyethylene, polyurethane, polypropylene, polyethylene terephthalate or a combination of the above.

In order to provide the second substrate layer with a certain softness or suppleness, one or more plasticizers can be added thereto. Preferably, these plasticizers are present in an amount of more than 15 phr and more preferably even in an amount of minimum 20 phr.

Fillers, such as chalk, limestone and/or talc may also be added to the second substrate layer.

According to an alternative, the second substrate layer consists of one or a combination of the following materials: veneer, rubber, linoleum or any material, more particular cork, bamboo, or veneer, coated by vinyl or resin.

With the aim of increasing the stability, the second substrate layer can be provided with at least one reinforcement layer, preferably of glass fiber or the like.

The floor panel may comprise a backing layer, which preferably is located directly underneath the first substrate layer. The backing layer preferably shows one or a combination of the following characteristics:

the backing layer consists of a thermoplastic synthetic material layer and/or of a hot-melt glue;

the backing layer is realized on the basis of one or more of the following materials: cork, rubber and/or foam.

The backing layer may provide the floor panel with acoustic features, such that, for example, footfall sound during walking on installed floor panels is dampened.

The floor panel may comprise a top layer, whether or not consisting of a plurality of layers, which top layer preferably is situated directly above the second substrate layer. The top layer may comprise one or a combination of the following characteristics:

- the top layer comprises at least a decorative layer, preferably in the form of a print, preferably provided on a foil or film, which foil or film preferably is of a thermoplastic kind;
- the top layer comprises at least a translucent or transparent wear layer, which preferably relates to a foil or film, in particular of the thermoplastic type.

In an alternative embodiment, the second substrate layer can be provided with a backing layer on the lower side of the second substrate layer, wherein this backing layer may or may not be combined with said top layer.

Preferably, the floor panel has a thickness which is smaller than 10 mm, still better in the order of magnitude of 8 mm, or possibly thinner.

The aforementioned composed substrate substantially is realized massive.

The composed substrate of the present invention is particularly suited for making the downward-directed locking element and/or the upward-directed locking element substantially massive. This offers the advantage that the strength of the locking can even be enhanced.

The downward-directed locking element and the upward-directed locking element each may be provided with a locking surface, which locking surfaces, in the coupled condition of two of such floor panels, cooperate. There, where they cooperate in the coupled condition of two of such floor panels, these locking surfaces preferably define a tangent line which is situated vertically or does not deviate more than 45 degrees from the vertical. Hereby, the advantage is obtained that a strong horizontal locking can be provided, which is beneficial for the general strength of the coupling.

In order to still improve the smoothness of installation, the proximal extremity of the upper hook-shaped part and/or the distal extremity of the lower hook-shaped part preferably is free from locking parts. In the coupled condition of two of such floor panels, the distal extremity of the lower hook-shaped part even preferably is separated from the opposite floor panel, which offers the advantage that sufficient space can be offered for a possible bending-out of the lip of the lower hook-shaped part when performing the coupling movement.

It is particularly advantageous to form the locking parts as parts which, during said downward movement, engage behind each other by means of a snap action, and more particularly to form them in one piece in the material of the composed substrate. To wit, it is so that the composed substrate shows excellent features in order to smoothly position such snap portions behind each other when performing the coupling movement.

Preferably, even the aforementioned coupling parts substantially are realized in the material of the floor panel, and more particularly in said composed substrate, and preferably are made entirely in one piece therewith.

The floor panel can be rectangular, either oblong or square, wherein said two opposite edges form a first pair of opposite edges and apart therefrom the floor panel comprises a second pair of opposite edges, which also comprises coupling parts, which coupling parts allow a locking in a first direction perpendicular to the respective edges and in the plane of the floor panel, as well as in a second direction perpendicular to the plane of the floor panel.

The present invention is directed in particular to such floor panel wherein the coupling parts on the second pair of opposite edges are configured such that two of such floor panels can be coupled at this second pair of opposite edges by means of a turning movement of one floor panel in respect to the other floor panel, in such a manner that a plurality of such floor panels can be coupled by means of a so-called "fold-down" technique. The advantages mentioned herein above will be clearly apparent in particular with such floor panels of the fold-down type.

Preferably, said coupling parts on the second pair of opposite edges substantially are realized in the material of the floor panel itself and more particularly in said composed substrate, and preferably are made entirely in one piece therewith.

The floor panel preferably is oblong rectangular, wherein the first pair of opposite edges forms the short sides of the floor panel and the second pair of opposite edges forms the long sides of the floor panel.

In an alternative, the floor panel is oblong rectangular, wherein the first pair of opposite edges forms the long sides of the floor panel and the second pair of opposite edges forms the short sides of the floor panel.

It is noted that by "composed substrate", also a composed substrate produced in one piece has to be understood. Apart therefrom, it is noted that the substrate layers of the composed substrate as such may also be realized multi-layered. In the case that such substrate layer is realized multi-layered, these layers of the plurality of layers of the substrate layer in particular are similar to each other in that sense that they consist of substantially the same materials and/or have the same composition.

It is also noted that the locking surfaces do not necessarily have to be flat but can also, for example, be curved or bent. In the case that these locking surfaces are curved, they can there, where they cooperate in the coupled condition, define more than one tangent line, however, in accordance with each of the six aspects, they have to define at least one tangent line, which is horizontal or does not deviate more than 50 degrees from the horizontal.

It is noted that by "massive" must be understood that no weakened portions and/or recesses are provided in order to allow certain deformations. Herein, it is also noted that by "substantially massive" is intended that, although such weakened portions and/or recesses are not excluded, these extend only to a minor extent over the part in which they are provided.

It is noted that by "layers situated directly above each other", it is not excluded that possibly glue is present between these layers.

BRIEF DESCRIPTION OF THE DRAWINGS

With the intention of better showing the characteristics of the invention, herein below, as an example without any limitative character, some preferred embodiments are described, with reference to the accompanying drawings, wherein.

DETAILED DESCRIPTION OF PREFERRED EMBODIMENTS OF THE INVENTION

Figure 1:
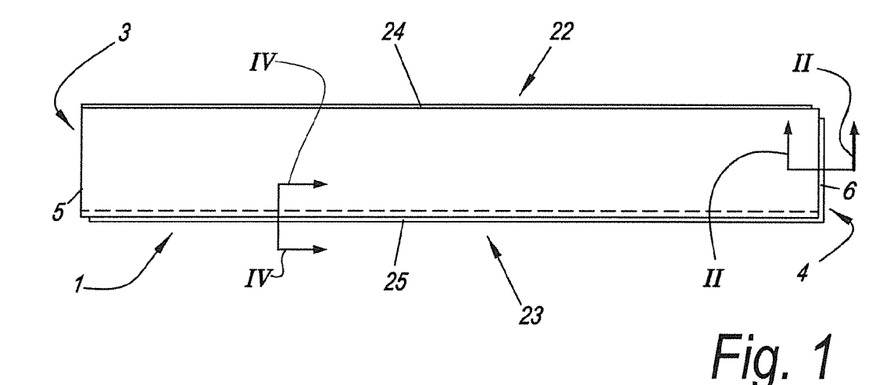
FIG. 1 in top view represents a floor panel according to the invention.

FIG. 1 represents a floor panel 1 according to the present invention. The floor panel 1 comprises coupling parts 5-6 on at least two opposite edges 3-4.

Figure 2:
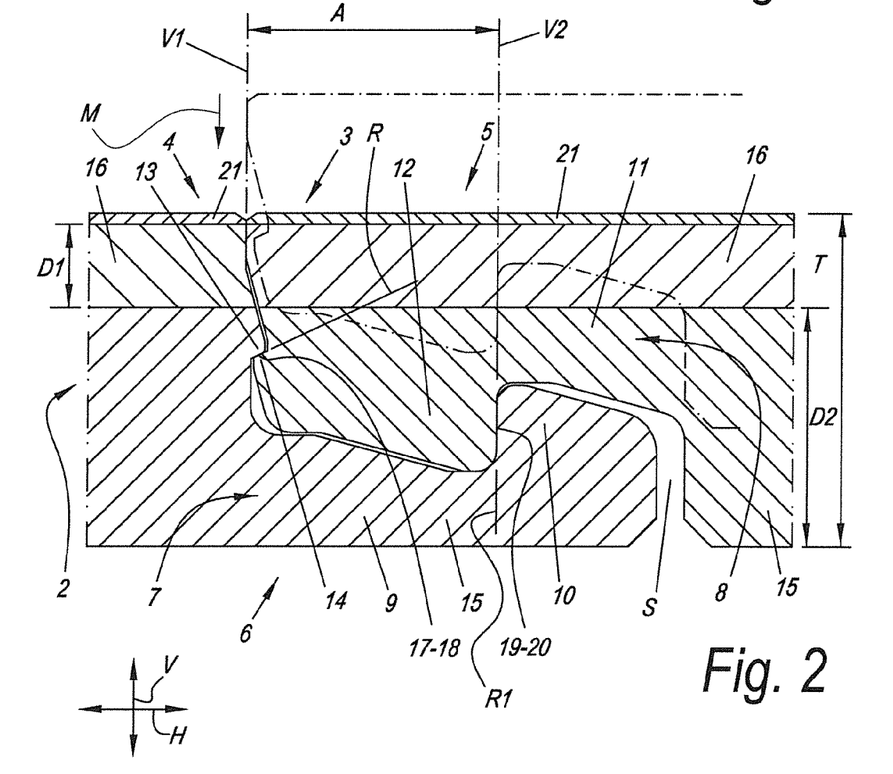
FIG. 2 represents a cross-section according to line II-II in FIG. 1, however, in the coupled condition of two of such floor panels, which can be seen as an embodiment of at least the independent aspects 1, 2, 3, 4 and 5.

FIG. 2 represents a cross-section according to line II-II in FIG. 1, however, in a coupled condition of two of such floor panels 1. The floor panel 1 comprises a composed substrate 2, which in the example is realized massive. The floor panel 1 further has a thickness T which is smaller than 10 mm and still better is in the order of magnitude of 8 mm or thinner.

The coupling parts 5-6 substantially are realized of the material of the composed substrate 2 and are made in one piece therewith.

The coupling parts 5-6 allow that two of such floor panels 1 can be coupled to each other by means of a downward movement M of one floor panel 1 in respect to the other floor panel 1. In the coupled condition, the coupling parts 5-6 form a first locking system, which effects a locking in a first direction H in the plane of the floor panels 1 and perpendicular to the aforementioned edges 3-4, as well as a second locking system, which effects a locking in a second direction V transverse to the plane of the floor panels 1.

The first locking system is formed by an upward-directed lower hook-shaped part 7 which is situated on the edge 4, as well as a downward-directed upper hook-shaped part 8 which is situated on the opposite edge 3. The hook-shaped parts 7-8 can be engaged behind each other by means of the downward movement M. The lower hook-shaped part 7 consists of a lip 9 with an upward-directed locking element 10, whereas the upper hook-shaped part 8 consists of a lip 11 with a downward-directed locking element 12.

The locking elements 10 and 12 are made massive.

The second locking system comprises locking parts 13-14, which respectively are situated in the proximity of the proximal extremity of the lower hook-shaped part 7 and the distal extremity of the upper hook-shaped part 8.

The locking parts 13-14 are made as parts which, during said downward movement M, engage behind each other by means of snap action, wherein these locking parts 13-14 here are made in one piece in the material of the composed substrate 2.

The distal extremity of the lower hook-shaped part 7 is free from locking parts, just like the proximal extremity of the upper hook-shaped part 8. The distal extremity of the lower hook-shaped part 7 here even is separated from the opposite floor panel 1 or from the opposite edge 3 by means of a space S.

The composed substrate 2 consists of two substrate layers 15-16, to with a first synthetic material-based substrate layer 15 and a second substrate layer 16 situated there above. The second substrate layer 16 has a thickness D1 of at least 0.5 mm and preferably at least 1 mm. The first substrate layer 15 has a density D2 of at least 3 mm, preferably at least 4 mm and more preferably at least 5 mm.

The substrate layers 15-16 can show one or more of the following characteristics:

the density of the first substrate layer 15 is different from the density of the second substrate layer 16, and preferably the second substrate layer 16 has a higher density than the first substrate layer 15;

the first substrate layer 15 is foamed and preferably is of the closed cell-type and still more preferably of the so-called hard foam-type, and preferably the second substrate layer is not foamed or is less foamed than the first substrate layer 15;

the first substrate layer 15 is extruded; and/or both substrate layers 15-16 are glued to each other, preferably by means of a waterproof glue.

In case that the first substrate layer 15 is foamed, this first substrate layer 15 can be foamed gradually, wherein the degree of foaming, for example, increases in downward or in upward direction.

The substrate layers 15-16 further can be realized as described herein above in the introduction.

The locking parts 13-14 are provided with locking surfaces 17-18, which, there, where they cooperate in the coupled condition of two of such floor panels 1, define a tangent line R which is horizontal or does not deviate more than 50 degrees from the horizontal. In the example represented here, the tangent line R deviates approximately 25 degrees from the horizontal.

The locking surfaces 17-18 are situated closer to the upper side of the first substrate layer 15 than to the lower side of the first substrate layer 15. In the example represented here, the locking surfaces 17-18 are situated entirely in the first substrate layer 15.

The upward-directed locking element 10 and the downward-directed locking element 12 are provided with locking surfaces 19-20. These locking surfaces 19-20, in the coupled condition of two of such floor panels 1, cooperate and prevent the moving apart of the floor panels 1 in the direction H or at least counteract such moving apart of the floor panels.

There, where the locking surfaces 19-20 cooperate in the coupled condition of two of such floor panels 1, they define a tangent line R1, which is situated vertically or does not deviate more than 45 degrees from the vertical. In the example, the tangent line R1 is situated vertically.

The locking distance A, which is formed by the horizontal distance between a vertical closing surface V1 formed between two of such coupled floor panels 1 and a vertical plane V2 through the middle of the zone over which the locking surfaces 19-20 make contact in the coupled condition, is smaller than 1 cm, preferably smaller than 5 mm and more preferably smaller than 3 mm.

The floor panel 1 also comprises a top layer 21, which in this example is situated above the second substrate layer 16. The top layer 21 further can be realized such as described herein above in the introduction.

Figure 3:
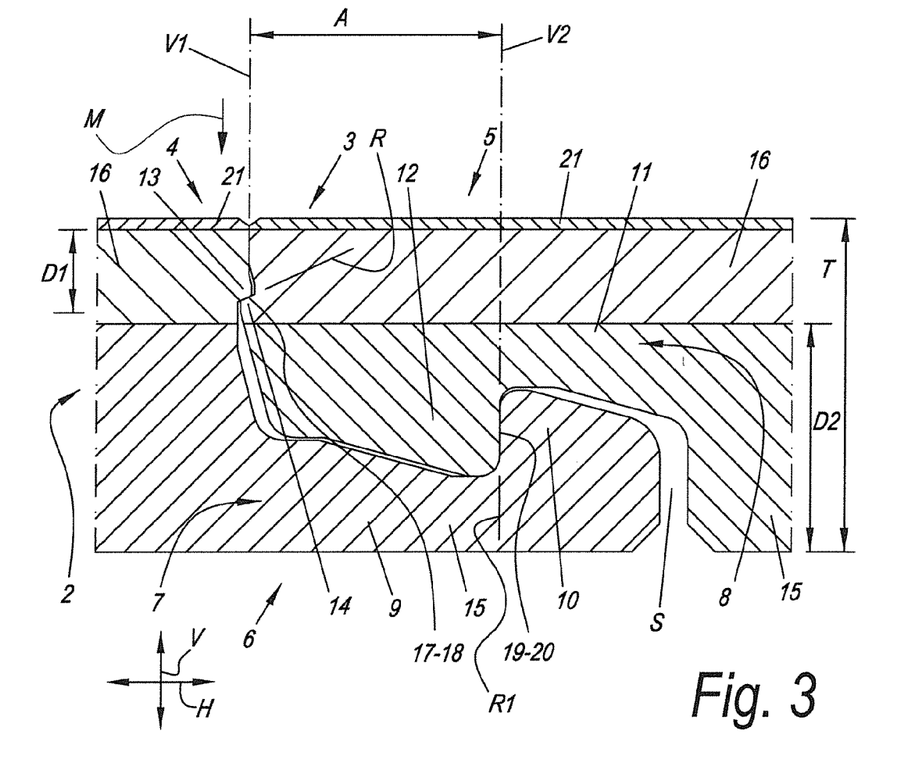
FIG. 3 represents a variant of FIG. 2, which can be seen as an embodiment of at least the independent aspects 1, 2, 3, 4 and 6.

FIG. 3 represents a variant of FIG. 2, wherein similar parts or elements are indicated by the same reference numerals and letters as in FIG. 2.

As in FIG. 2, the composed substrate 2 in FIG. 3 consists of two substrate layers 15-16, which can be realized as described herein above in the introduction.

The locking parts 13-14 are provided with locking surfaces 17-18, which there, where they cooperate in the coupled condition of two of such floor panels 1, define a tangent line R, which is horizontal or does not deviate more than 50 degrees from the horizontal. In the example represented here, the tangent line R deviates approximately 25 degrees from the horizontal.

There, where the locking surfaces 19-20 cooperate in the coupled condition of two of such floor panels 1, they define a tangent line R1, which is situated vertically or does not deviate more than 45 degrees from the vertical. In the example, the tangent line R1 is situated vertically.

The locking distance A is smaller than 1 cm, preferably smaller than 5 mm and more preferably smaller than 3 mm.

Contrary to what is shown in FIG. 2, in FIG. 3 the locking surfaces 17-18, however, are situated in the second substrate layer 16. However, they are situated closer to the upper side of the first substrate layer 15 than to the lower side of the first substrate layer 15.

As represented in FIG. 1, the floor panel 1 is rectangular and here more particularly oblong. Apart from the pair of opposite edges 3-4, which forms the pair of short sides of the floor panel 1, the floor panel 1 also comprises a pair of opposite edges 22-23, which forms the pair of long edges of the floor panel 1.

The pair of opposite edges 22-23 also comprises coupling parts 24-25.

Figure 4:
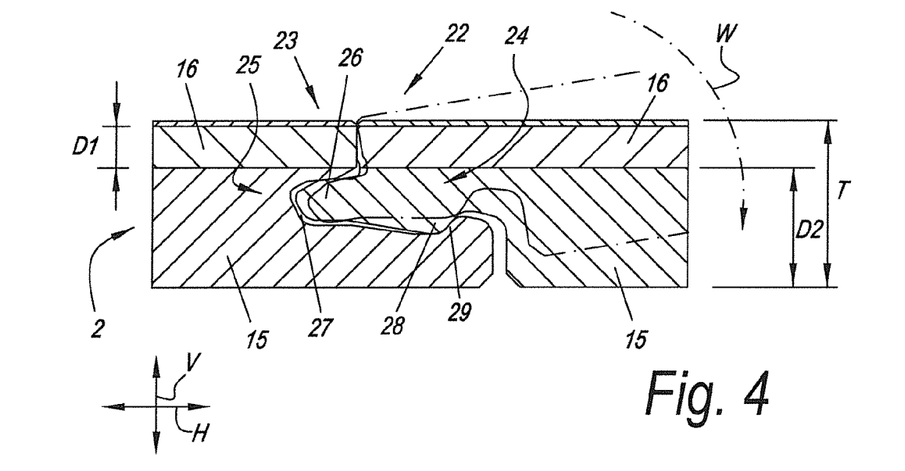
FIG. 4 represents a cross-section according to line IV-IV in FIG. 1, however, in the coupled condition of two of such floor panels.

FIG. 4 represents a cross-section according to line IV-IV in FIG. 1, however, in the coupled condition of two of such floor panels 1.

The coupling parts 24-25 allow effecting a locking in a direction H perpendicular to the respective edges 22-23 and in the plane of the coupled floor panels 1, as well as effecting a locking in a direction V perpendicular to the plane of the coupled floor panels 1.

The coupling parts 24-25 are configured such that they allow coupling two of such floor panels 1 by means of a turning movement W.

The coupling parts 24-25 are manufactured substantially from the material of the composed substrate 2 and are made in one piece therewith.

The coupling parts 24-25 substantially are made as a tongue 26 and a groove 27, which are provided with locking parts 28-29. These locking parts 28-29 prevent the moving apart of the coupled floor panels 1 according to the direction H or at least counteract such moving apart of the floor panels 1.

Figure 5:
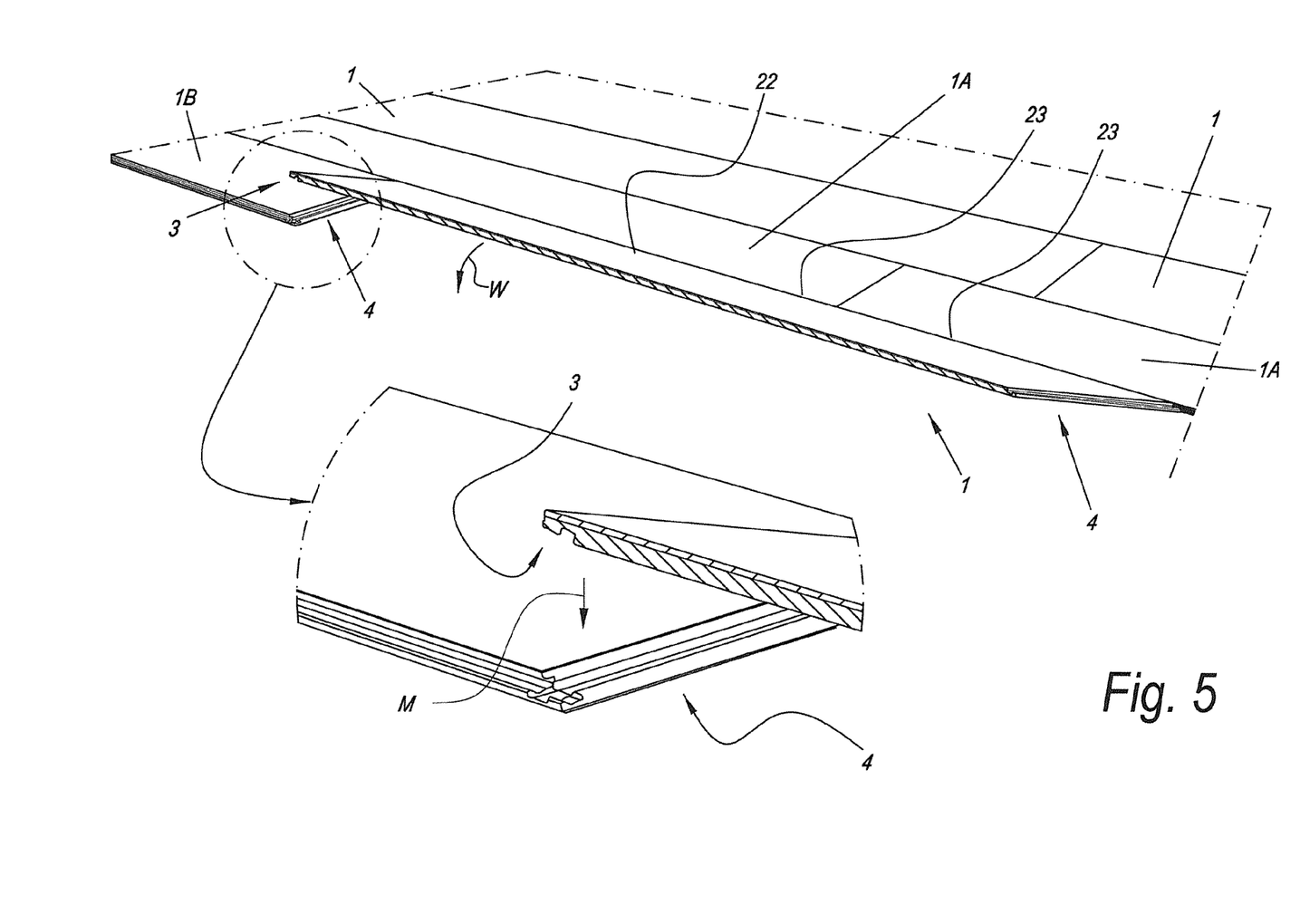
FIG. 5 represents how such floor panels can be coupled by means of the so-called "fold-down" technique.

FIG. 5 represents how the floor panels 1 of FIG. 1 can be coupled by means of the so-called "fold-down" technique. In the figure, a partially finished floor covering is shown with amongst others a row of already installed floor panels 1A and a row with the already installed floor panel 1B. The floor panel 1C is to be installed in the row of the floor panel 1B and thus must be coupled to the floor panels 1A and 1B. More particularly, the floor panel 1C must be coupled with its long edge 22 to the long edges 23 of the floor panels 1A, and must be coupled with its short edge 3 to the short edge 4 of the floor panel 1B.

The fold-down movement is performed by turning the floor panel 1C, from an inclined position with its tongue 26 already partially introduced in the groove 27 of the floor panels 1A, downward according to a movement W. With this movement, the long edges 22-23 are coupled to each other and at the same time the short edges 3-4 are coupled by the downward movement M which is associated with the turning movement W. Thus, in other words, in one and the same movement W the floor panel 1, at its long edge 22 as well as at its short edge 3, is coupled to the already installed floor panels 1A-1B.

The present invention is in no way limited to the herein above-described embodiments, on the contrary, such floor panels can be realized according to various variants, without exceeding the scope of the present invention.

The invention claimed is:

1. A floor panel for forming a floor covering, wherein said floor panel comprises:

a composed substrate and a top layer located directly above the composed substrate;

wherein the floor panel comprises coupling parts on at least two opposite edges, which coupling parts allow that said floor panel can be coupled to another of said floor panel by means of a turning movement of one floor panel in respect to the other floor panel;

wherein these coupling parts, in a coupled condition of two of such floor panels, effect a locking in a first direction in a plane of the floor panels and perpendicular to said edges, as well as effect a locking in a second direction transverse to the plane of the floor panels;

wherein the coupling parts are made as a tongue and a groove;

wherein the composed substrate consists a first substrate layer and a second substrate layer located directly above the first substrate layer;

wherein the first substrate layer comprises a thermoplastic material and a filling material;

wherein the first substrate layer constitutes more than half of a thickness of the floor panel;

wherein the first substrate layer is foamed;

wherein the second substrate layer comprises a thermoplastic material and plasticizers;

wherein the composed substrate is produced in one piece;

wherein the coupling parts are formed by the first and second substrate layers;

wherein the second substrate layer is not foamed or is less foamed than the first substrate layer;

wherein the second substrate layer has a higher density than the first substrate layer.

2. The floor panel of claim 1, wherein the first substrate layer is of a rigid type and comprises no plasticizers or plasticizers in an amount of less than 20 phr.

3. The floor panel of claim 1, wherein the thermoplastic material of the first substrate layer is selected from a list containing polyvinyl chloride, polyethylene, polypropylene, polyethylene terephthalate and polyurethane.

4. The floor panel of claim 1, wherein the second substrate layer comprises plasticizers in an amount of more than 15 phr.

5. The floor panel of claim 1, wherein the thermoplastic material of the second substrate layer is selected from a list containing polyvinyl chloride, polyethylene, polypropylene, polyethylene terephthalate and polyurethane.

6. The floor panel of claim 1, wherein the second substrate layer comprises a filling material.

7. The floor panel of claim 6, wherein the filling material of the second substrate layer is selected form a list containing chalk, limestone and talc.

8. The floor panel of claim 1, wherein the filling material of the first substrate layer is selected form a list containing chalk, limestone and talc.

9. The floor panel of claim 1, wherein the second substrate layer has a thickness of at least 0.5 mm.

10. The floor panel of claim 1, wherein the first substrate layer has a thickness of at least 3 mm.

11. The floor panel of claim 1, wherein the first substrate layer is of a closed cell-type and of a hard foam-type.

12. The floor panel of claim 1, wherein the top layer comprises a decorative layer in the form of a print and a translucent or transparent wear layer.

13. The floor panel of claim 12, wherein the decorative layer is in the form of a print provided on a thermoplastic film.

14. The floor panel of claim 1, wherein the first substrate material and the second substrate material comprise both a same thermoplastic material, selected from a list containing polyvinyl chloride, polyethylene, polypropylene, polyethylene terephthalate and polyurethane.

15. The floor panel of claim 1, wherein the floor panel comprises a backing layer located below the first substrate layer.

16. The floor panel of claim 15, wherein the backing layer comprises a material selected from a list containing thermoplastic material, cork and rubber.

* * * * *